United States Patent
Hofmann

(10) Patent No.: US 6,544,023 B2
(45) Date of Patent: Apr. 8, 2003

(54) INDUSTRIAL DATA TRANSMISSION SYSTEM

(75) Inventor: Werner Hofmann, Schnaittach (DE)

(73) Assignee: Siemens Aktiengesellschaft (DE)

( * ) Notice: Subject to any disclaimer, the term of this patent is extended or adjusted under 35 U.S.C. 154(b) by 40 days.

(21) Appl. No.: 09/892,413

(22) Filed: Jun. 27, 2001

(65) Prior Publication Data

US 2002/0127294 A1 Sep. 12, 2002

(30) Foreign Application Priority Data

Mar. 6, 2001 (DE) .......................... 101 10 675

(51) Int. Cl.[7] .............................. B29C 45/76
(52) U.S. Cl. .................. 425/143; 425/149; 425/162
(58) Field of Search ................. 425/143, 149, 425/162

(56) References Cited

U.S. PATENT DOCUMENTS 5,792,483 A * 8/1998 Siegrist et al. ............. 425/162

OTHER PUBLICATIONS

Druckschrift: "Standardisierter Feldbus für dic elektrische Antriebstechnik," VDI Bericht, 844, Bericht "SERCOS–Interface", Seite 69 pp.

* cited by examiner

*Primary Examiner*—Tim Heitbrink
(74) *Attorney, Agent, or Firm*—Baker Botts LLP

(57) ABSTRACT

The invention relates to an industrial data transmission system for the registering of process parameters in a periodic bus cycle with a fixed time frame, a synchronizing signal within each cycle having the effect in each case that a multiplicity of process parameters are simultaneously registered and recorded and, in a subsequent data exchange phase, are transmitted to the open-loop and/or closed-loop process control system. In this system, all the time-critical process input and output parameters are registered simultaneously. In a subsequent open-loop and/or closed-loop process control phase, a processing of the high-priority process data takes place. These data are used in particular for plastics injection-molding machines for detecting the changeover point. Furthermore, use is made of a machine production cycle with bus subcycles, which may respectively have a synchronizing signal and different information contents and/or or lengths.

4 Claims, 2 Drawing Sheets

INDUSTRIAL DATA TRANSMISSION SYSTEM

BACKGROUND OF THE INVENTION

The present invention relates to an industrial data transmission system for the registering of process parameters in a periodic bus cycle with a fixed time frame, a synchronizing signal within each cycle having the effect in each case that a multiplicity of process parameters are simultaneously registered and recorded and, in a subsequent data exchange phase, are transmitted to an open-loop and/or closed-loop process control system.

It is known from the printed document "Standardisierter Feldbus fur die elektrische Antriebstechnik" [standardized field bus for electrical drive engineering], VDI reports, 844, "SERCOS interface" report, page 69 ff., that a time-controlled bus access to drives can be performed with the aid of the SERCOS interface. The data messages which are intended for the individual drives are sent in a fixed time frame. An open-loop or closed-loop control system undertakes the master function and, at the cycle time intervals, sends a synchronizing signal, in response to which the individual drives, known as the slaves, transmit their information to the master.

In the open-loop and closed-loop control of production machines, in particular plastics injection-molding and/or blow-molding installations, precise measured data acquisition and high control accuracy of the final control elements is of great importance for ensuring the quality of the parts produced. A prerequisite for rapid and precise closed-loop control is the smallest possible time span between the reception of the actual process values of the sensor and the processing, and also the subsequent output of new setpoint values to an actuator.

Nowadays, a large number of products or intermediates which are used in industry and in the consumer goods sector are produced by plastics injection-molding and/or blow-molding installations. These products have to meet increasingly high requirements in terms of production quality. The object of the invention is to provide an industrial data transmission system with process requirements optimized for plastics injection-molding and/or blow-molding installations.

SUMMARY OF THE INVENTION

According to the present invention, the object is achieved by having all of the time-critical process input and output parameters registered simultaneously for the open-loop and closed-loop control of a plastics injection-molding and/or blowmolding installation. The process peripherals, which in such installations may for example be arranged decentrally from the open-loop or closed-loop control system, record all the measured parameters with the synchronizing signal. The measured data are consequently not acquired asynchronously in relation to one another and can advantageously be processed in the open-loop and closed-loop control system with a fixed time reference point.

A first preferred design of the present invention is characterized in that, after the data exchange phase with decentralized process peripherals, there follows an openloop and/or closed-loop process control phase for high-priority process parameters. The time interval from the measured data acquisition (synchronizing signal) until the processing (open-loop and/or closed-loop control phase) is at the least within the time segment for the processing of high-priority process parameters. In the open-loop and/or closed-loop process control phase for high-priority process parameters, predominantly only time-critical process variables are processed. This procedure ensures that an immediate response can be made in particular to time-critical process changes.

A further preferred design of the present invention is characterized in that, after the data exchange phase, there occurs a high-priority detection of the changeover point for plastics injection-molding machines, at which time a change is made from an injection operation to a holding-pressure operation. During the operation of injecting the plastic, the injection pressure constitutes a time-critical process parameter.

To achieve the highest possible number of units in the production process, a high rate of injection into the injection mold is used. When the injection mold is filled, undiminished maintenance of the rate of injection leads to a high increase in pressure. The open-loop and/or closed-loop process control system must consequently register the changeover point, at which time a significant increase in pressure occurs at a rapid rate, as quickly as possible and respond to it as quickly as possible. This is ensured in the present invention by the data exchange phase being directly followed by a computing operation time for detection of the changeover point, which initiates further closed-loop or open-loop control steps immediately when detection occurs.

A further preferred design of the present invention is characterized in that a periodically recurring machine production cycle comprises bus subcycles, which are respectively provided with a synchronizing signal and have different information contents and/or different lengths. Different measured process variables generally also have different process time constants. To allow for these properties in an advantageous way, the production cycle of an injection-molded part can be broken down into a specific number of bus subcycles. It is not always necessary to measure all the process variables in these subcycles. In particular in the case of measured parameters with large time constants in comparison with the system, it may for example, be advisable to register these in every second bus subcycle or at even greater time intervals. The different lengths and different information contents of the bus subcycles have the effect that time-critical measured parameters can on average be measured at shorter time intervals, in comparison with a measuring system which registers all the measured parameters in every cycle. Consequently, the response time to a time-critical event is also advantageously diminished.

DRAWINGS

An exemplary embodiment of the invention is explained in more detail below and is represented in the drawings, in which.

DETAILED DESCRIPTION OF THE INVENTION

Figure 1:
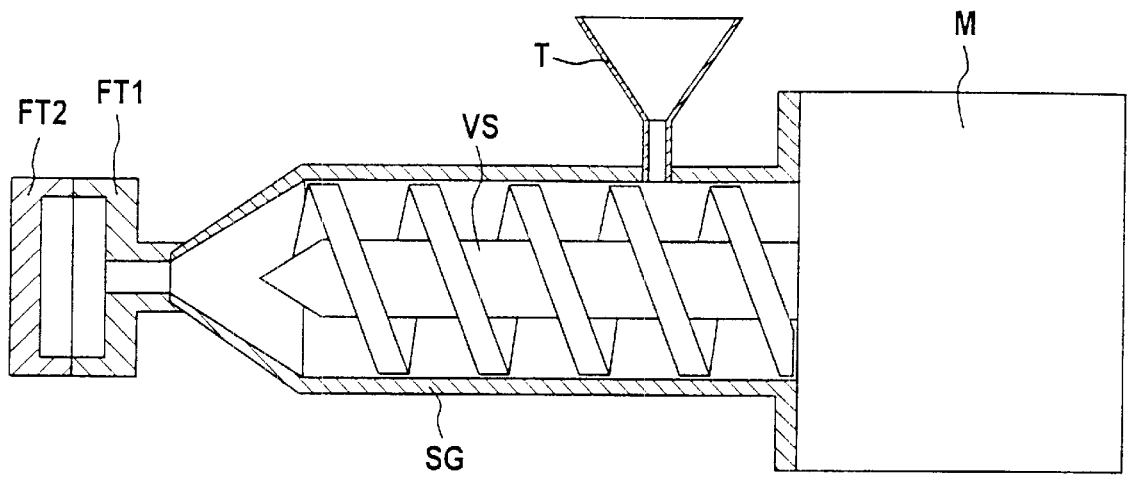
FIG. 1 shows a basic construction of an injection-molding machine.

In FIG. 1, a plastics injection-molding machine is shown in the form of a basic representation. A hopper T is filled with polymer granules, which enter a screw housing SG. In or along the screw housing SG, toward the plastics mold, there are generally heating zones, which heat up the polymer granules. For the sake of overall clarity, the heating zones are not shown in FIG. 1.

An advancing screw VS in the screw housing SG having a helical design, is driven by a motor M and is capable of injecting the polymer granules, or the plastic material present in the constricted region of the screw housing, into the plastics mold. The plastic mold in this case comprises two mold parts FT1 and FT2, which are moved apart after the injecting and solidifying operation, in order to release the injection-molded product. For the sake of overall clarity, the polymer granules, the plastic material and the injection-molded product in the mold parts FT1 and FT2 are not shown in FIG. 1.

A wide variety of measured parameters can be recorded during the operation of a plastics injection-molding machine, including, for example, the injection pressure, rate of injection, pressure, torque of the advancing screw VS, position of the advancing screw VS, etc. For the sake of overall clarity, the different measuring transducers for this have not been shown in FIG. 1.

Figure 2:
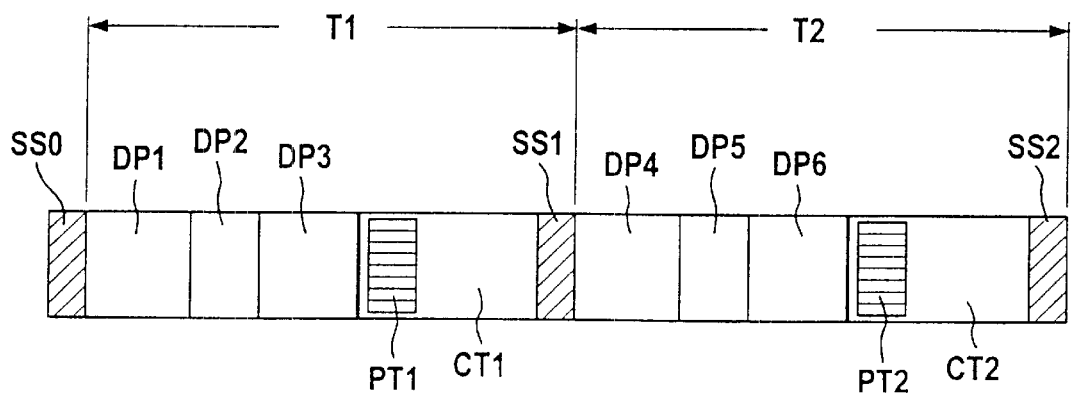
FIG. 2 shows a combination of periodic bus cycles.

In the representation according to FIG. 2, a combination of two periodic bus cycles is shown. The cycle duration T1 and T2 is depicted in each case by a horizontal double-headed arrow. At the beginning and end of each double-headed arrow there are vertical lines, which confine the operations taking place in the cycle T1 and T2, respectively. These operations are listed under the respective double-headed arrows of the cycles T1 and T2.

A synchronizing signal SS0 to SS2 causes process data to be simultaneously registered and sent to an open-loop and/or closed-loop control unit in the respectively following data packet times DP1 to DP6. For respective process peripherals, the data sending time is defined in a cycle T1 or T2 in such a way that no collision of data occurs on the data line.

Once the last data have been transmitted to the open-loop and/or closed-loop control unit in the data packet time DP3 or DP6 of the process peripherals, there follows a computing operation time CT1 or CT2 (controller task) of the open-loop and/or closed-loop control unit. At the beginning, of the respective computing operation time CT1 or CT2, high-priority process parameters PT1 or PT2 are processed. This is shown in the representation according to FIG. 2 in the respective computing operating times CT1 and CT2 by horizontally hatched rectangles PT1 and PT2 (priority tasks).

The computing operation time for high-priority process parameters PT1 or PT2 can be used, for example, to detect in the case of a plastics injection-molding machine a changeover point, at which time a change is made from an injection operation to a holding-pressure operation.

Both at the end and beginning of a respective computing operation time CT1 and CT2, a synchronizing signal SS0 to SS2 is sent, causing the process peripherals to register their respective measured data simultaneously. This procedure ensures the use of data on process peripherals that are always time-synchronously registered.

The computing operation times CT1 and CT2 may also extend up to the entire cycle time T1 and T2, respectively, so that data packet times DP1 to DP3 and DP4 to DP6 respectively take place in parallel. The computing speed can in this case be reduced.

Figure 3:
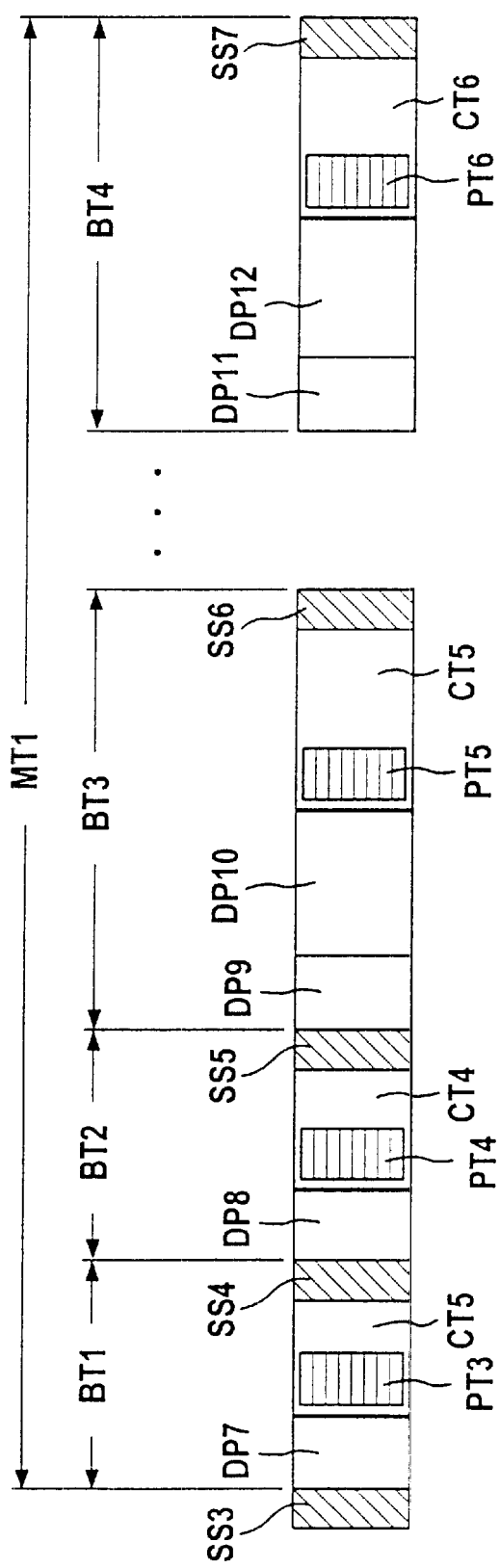
FIG. 3 shows a combination of bus subcycles with different information contents and/or different lengths.

In the representation according to FIG. 3, a combination of bus subcycles BT1 to BT4 with different information contents and/or different lengths is shown. Before the beginning and at the end of a bus subcycle BT1 to BT4, there takes place a time segment for a synchronizing signal SS3 to SS7, in which all the process data are time-synchronously registered. This situation has already been described with reference to FIG. 2, in which the cycles T1 and T2 are respectively of the same construction. In contrast, the bus subcycles in FIG. 3 have a different length, with a different information content. The bus subcycles BT1 and BT2 have an identical cycle length. In their respective cycle time, a data packet time DP7 and DP8 is respectively set up, after which there follows a respective computing time segment CT3 or CT4, in which a time segment is provided for high-priority commands PT3 and PT4, respectively. In the data packet times DP7 and DP8, information from the same information source may be transmitted, such as for example the temperature information from one measuring point, but information from different measuring points may also be transmitted. For example, a measured temperature value could be transmitted in the data packet time DP7 and a measured pressure value could be transmitted in data packet time DP8.

The bus subcycles BT3 and BT4 have different bus subcycle lengths than the bus subcycles BT1 and BT2. The data packet times DP9 to DP12 may also be of different lengths. Furthermore, computing times for high-priority commands PT5 and PT6, which are located in the respective computing operation time CT5 and CT6, are provided in the bus subcycles BT3 and BT4.

The bus subcycles BT1 to BT4 are combined in FIG. 3 into a machine production cycle MT1, it being possible for the machine production cycle MT1 also to comprise further bus subeycles BT1 to BT4. This is indicated in FIG. 3 by three dots between the bus subcycles BT3 and BT4.

This procedure makes it possible not to read in and evaluate all the measured data in every bus subcycle BT1 to BT4, but instead to select relevant data specifically for the respective bus subcycle BT1 to BT4. This avoids data ballast, which is registered and transmitted in the system although a measured variable concerned changes only relatively slowly.

I claim:

1. A data transmission system for use in a plastic molding machine having a process control selected from the group consisting of an open-loop, closed-loop and a combination thereof, the system comprising a synchronizing signal for registering and recording a plurality of process parameters including high priority process input and output parameters in a periodic bus cycle having a fixed time-frame and wherein at least said high-priority parameters are transmitted during a data exchange phase to the process control and simultaneously registered.

2. The industrial data transmission system according to claim 1, wherein after the data exchange phase, there follows an open-loop and/or closed-loop process control phase for high-priority process parameters.

3. The industrial data transmission system according to claim 1, wherein after a data exchange phase high-priority process parameters are used to detect when the operation of the molding machine changes from an injection operation to a holding-pressure operation.

4. The industrial data transmission system according to claim 1, wherein a periodically recurring machine production cycle comprises bus subcycles which are respectively provided with a synchronizing signal and have different information contents and/or different lengths.

* * * * *